(12) United States Patent
Yoshida et al.

(10) Patent No.: US 6,534,595 B2
(45) Date of Patent: Mar. 18, 2003

(54) COATING SOLUTION FOR FORMING POROUS ORGANIC FILM

(75) Inventors: Yuji Yoshida, Tokyo (JP); Hyuncheol Choi, Tsukuba (JP); Atsushi Sukumoda, Tsukuba (JP)

(73) Assignee: Sumitomo Chemical Company, Limited, Osaka (JP)

( * ) Notice: Subject to any disclaimer, the term of this patent is extended or adjusted under 35 U.S.C. 154(b) by 0 days.

(21) Appl. No.: 09/742,216

(22) Filed: Dec. 22, 2000

(65) Prior Publication Data

US 2001/0038887 A1 Nov. 8, 2001

(30) Foreign Application Priority Data

Dec. 27, 1999 (JP) ............................................. 11-370692

(51) Int. Cl.$^7$ ............................................. C08L 71/12
(52) U.S. Cl. .................. 525/106; 525/132; 525/152; 525/210; 525/219; 525/241; 427/271; 427/276; 427/385.5
(58) Field of Search ................. 525/106, 152, 525/219, 241, 132, 210; 427/271, 276, 385.5

(56) References Cited

U.S. PATENT DOCUMENTS

| 5,658,994 A | 8/1997 | Burgoyne, Jr. et. |
| 6,093,636 A | * 7/2000 | Carter et al. ................ 438/623 |

FOREIGN PATENT DOCUMENTS

| EP | 0 755 957 A1 | 1/1997 |
| JP | 8-162450 | 6/1996 |
| JP | 9-315812 | 12/1997 |
| JP | 10-70121 | 3/1998 |
| JP | 10-92804 | 4/1998 |
| JP | 10-158011 | 6/1998 |
| JP | 2933124 | 5/1999 |
| WO | WO 91/16369 | 10/1991 |
| WO | WO 97/01593 | 1/1997 |

\* cited by examiner

*Primary Examiner*—Margaret G. Moore
(74) *Attorney, Agent, or Firm*—Birch, Stewart, Kolasch & Birch, LLP

(57) ABSTRACT

A coating solution for forming porous organic film comprising the following A) to C), wherein A) and B) have respective heat decomposition initiation temperatures Ta and Tb satisfying a relation: Ta>Tb:

A) a thermosetting resin having an aromatic ring in the main chain,

B) a heat decomposable resin obtained by polymerization of monomers which include at least one compound represented by the following formula (1) or (2), and C) an organic solvent,

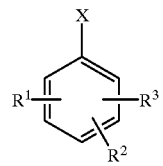
(1)

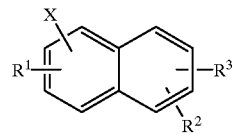

(2)

wherein, X and each of $R^1$ to $R^3$ are defined in the specification.

11 Claims, No Drawings

COATING SOLUTION FOR FORMING POROUS ORGANIC FILM

BACKGROUND OF THE INVENTION

1. Field of the Invention

The present invention relates to a porous organic film forming coating solution and a method for producing a porous organic film. Further, the present invention relates to a coating solution for forming a porous organic film suitable as an insulation film used in electronic devices, and a method for producing the porous organic film. More particularly, the present invention relates to a coating solution for forming a porous organic film suitable as an insulation film having low dielectric constant used in semiconductor parts, and a method for producing the porous organic film.

2. Description of the Related Art

In electronic parts, various insulation materials such as a layer insulation film, mold package material, wire coating material and the like are used. Recently, transferring speed of electron signals is respected for high speed communication, high speed processing and the like, and investigated from both of insulation material standpoint and wiring material standpoint. Particularly in LSI requiring high speed computing, signal transferring speed is important, and improvement in a process of producing a LSI itself and development of novel materials are flourishing. In the case of an insulation material, materials having lower dielectric constant, namely, materials having a relative dielectric constant of 3.0 or less, preferably 2.5 or less are required, for the purpose of securing high speed.

Relative dielectric constant is generally in proportion to the density and electron polarization nature of a material itself as represented by the formula of Clausis-Mosotti. Therefore, porous materials are respected for the purpose of decreasing relative dielectric constant by reduction of density. For example, JP-A Nos. 8-162450 and 10-70121 disclose a porous silica film obtained by conducting heat treatment under dry condition wherein shrinkage of an alkoxysilane is suppressed, and JP-A No. 9-315812 discloses a porous silica film obtained by mixing a colloidal silica with an alkoxysilane or a partial hydrolysis condensate and suppressing shrinkage ratio. However, a silica film gets increased surface area, further have enhanced water absorption and tends to manifest deteriorated dielectric constant by a porous structure, since water absorption of the film itself is remarkable. Consequently, surface hydrophobicizing treatment and the like are necessary, and throughput lowers.

While, an organic resin is a promising material for a porous structure since it has lower water absorption as compared with a silica film. A porous organic resin is already known as a construction material and insulation material, however, it can not get finer pore diameter due to use of a foaming agent. In the field of electronic parts, pore diameters of usually 0.3 µm or less, preferably 0.1 µm or less are required.

SUMMARY OR THE INVENTION

An object of the present invention is to provide a coating solution for forming a porous organic film which can get lower dielectric constant, as an insulation material usable in electronic parts, and a method for producing the porous organic film.

The present inventors have intensively studied a coating solution which can form a porous film usable in electronic devices, and a method for producing the porous organic film, and resultantly, found that a coating solution comprising a specific thermosetting resin, heat decomposable resin and organic solvent can be simply and conveniently coated on a substrate, and the heat decomposable resin can be decomposed to form uniformly fine cavity by conducting specific heat treatment, leading to completion of the present invention.

Namely, the present invention relates to a coating solution for forming a porous organic film comprising the following A) to C), wherein A) and B) have respective heat decomposition initiation temperatures Ta and Tb satisfying a relation: Ta>Tb:

A) a thermosetting resin having an aromatic ring in the main chain,

B) a heat decomposable resin obtained by polymerization of monomers which include at least one compound represented by the following formula (1) or (2), and C) an organic solvent,

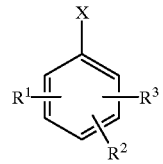
(1)

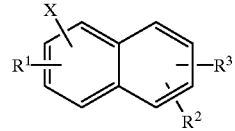
(2)

wherein, X represents an alkenyl group having 2 to 6 carbon atoms, each of $R^1$ to $R^3$ independently represents a hydrogen atom, or an alkyl group having 1 to 4 carbon atoms, and $R^1$, $R^2$ and $R^3$ in the formula (1) may be different from $R^1$, $R^2$ and $R^3$ in the formula (2), respectively.

The present invention also relates to a method for producing the porous organic film using the coating solution.

DETAILED DESCRIPTION OF THE PREFERRED EMBODIMENTS

A) is a thermosetting resin having an aromatic ring in the main chain, and an insulation resin having a thermosetting functional group. As the thermosetting resin, there are specifically exemplified thermosetting resins wherein the main chain is formed by connecting a group having one or more aromatic rings selected from the group consisting of a benzene ring, biphenyl ring, terpheyl ring and triazine group which may be substituted, via one or more functional groups selected from the group consisting of a direct bond, alkylene groups having 1 to 20 carbon atoms, ether group, amide group, ester group, ketone group and sulfone group, and a functional group which causes an intra-molecular and/or inter-molecular crosslinking reaction is present at the side chain or the end of the main chain.

Among resins of A), a resin having in the main chain a structure in which an aromatic ring is connected via an ether bond is preferable since the resin itself has low dielectric constant and excellent insulation property, and further lower dielectric constant can be attained by a porous structure.

Further, among resins of A), a resin having in the resin main chain a unit structure of the formula (3) is preferable since it has excellent solubility in an organic solvent, manifests excellent coatibility, and has a relative dielectric constant of 3.5 or less:

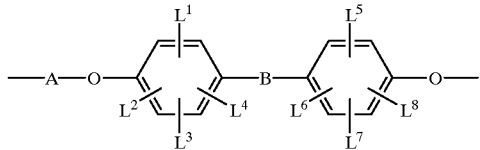
(3)

wherein, each of $L^1$ to $L^8$ is independently selected from a hydrogen atom, chlorine atom, bromine atom, iodine atom, alkyl groups having 1 to 10 carbon atoms, alkenyl groups having 2 to 10 carbon atoms, alkynyl groups having 2 to 10 carbon atoms, cycloalkyl groups having 4 to 10 carbon atoms, methoxy group, ethoxy group, phenyl group which may be substituted, and functional groups of the following formula (4). A is selected from one or more of the following functional groups. Further, in the formula, B is selected from one or more of a single bond, hydrocarbon groups having 1 to 20 carbon atoms, ether group, ketone group and sulfone group.

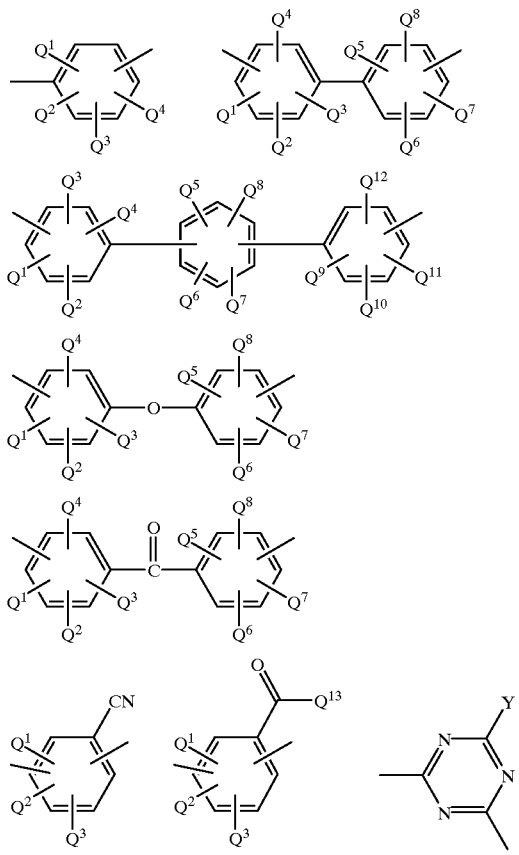

wherein, each of $Q^1$ to $Q^{12}$ is independently selected from a hydrogen atom, alkyl groups having 1 to 10 carbon atoms, alkenyl groups having 2 to 10 carbon atoms, alkynyl groups having 2 to 10 carbon atoms, and functional groups of the following formula (4). $Q^{13}$ is selected from alkyl groups having 1 to 10 carbon atoms, alkenyl groups having 2 to 10 carbon atoms, and alkynyl groups having 2 to 10 carbon atoms. Y is selected from a hydrogen atom, fluorine atom, chlorine atom, bromine atom, iodine atom, —$OZ^1$ group, and —$N(Z^2)(Z^3)$ group. Each of $Z^1$ to $Z^3$ is independently selected from a hydrogen atom, saturated or unsaturated hydrocarbon groups, and groups containing an ether bond.

$$—Si(T^1)_n(T^2)_{3-n} \qquad (4)$$

wherein, $T^1$ is selected from alkenyl groups having 2 to 10 carbon atoms. $T^2$ is selected from alkyl groups having 1 to 10 carbon atom, and arylene groups which may be substituted. n represents an integer of 1 to 3. $T^1$s may be mutually different when n is 2 or 3, and $T^2$s also may be mutually different when n is 1.

Specific examples of the group of the formula (4) include a vinyldimethylsilyl group, vinyldiethylsilyl group, vinylpropylsilyl group, vinyldiphenylsilyl group, vinyldinaphthylsilyl group, vinylmethylnaphthylsilyl group, vinylmethylethyllsilyl group, divinylethylpropylsilyl group, vinylpropylphenylsilyl group, divinylmethylphenylsilyl group, divinylmethylsilyl group, divinylethylsilyl group, divinylpropylsilyl group, divinylphenylsilyl group, allyldimethylsilyl group, allyldiethylsilyl group, allyldipropylsilyl group, allyldiphenylsilyl group, allyldinaphthylsilyl group, allylmethylnaphthylsilyl group, allylmethylvinylsilyl group, allylethylvinylsilyl group, allylpropylvinylsilyl group, allylphenylvinylsilyl group, diallylmethylsilyl group, diallylethylsilyl group, diallylpropylsilyl group, diallylphenylsilyl group, buteneyldimethylsilyl group, buteneyldiethylsilyl group, pentenyldimethylsilyl group, pentenyldiethylsilyl group, octenyldimethylsilyl group, decanyldimethylsilyl group, trivinylsilyl group, triallylsilyl group, tributenylsilyl group, trioctenylsilyl group, vinyldiallylsilyl group, divinylallylsilyl group, divinyloctenylsilyl group and the like.

The functional group manifesting thermosetting property in resins of A) may be a functional group bonded to other moieties than the end group of the main chain of a resin represented by $L^1$ to $L^8$, $Q^1$ to $Q^{13}$, or a functional bonded to the end group of the resin. However, when A) is plasticized in a process of decomposition and evapotranspiration of B) thermal expansion becomes resultantly non-uniform, and unevenness is formed on the surface of a coated film. Therefore, it is preferable that the thermosetting initiation temperature Tah of A) is lower than the decomposition temperature Tb of a heat decomposable resin. When unevenness is formed on the surface, residual stress is generated non-uniformly in a process of applying metal wirings on the surface of a porous film, and resultantly, undesirable phenomena such as wire breaking and the like occur.

Further, as the functional group manifesting thermosetting property, a functional group containing an unsaturated hydrocarbon group is particularly preferable since due to small volume shrinkage caused by thermosetting, remaining stress of a coated film itself is small, and film breaking does not easily occur in decomposing a heat decomposable resin, and due to small electron polarization after curing, deterioration in relative dielectric constant, and the like do not occur.

As the functional group containing an unsaturated hydrocarbon group, a functional group selected from a vinyl group, allyl group, propynyl group, vinyldialkylsilyl groups having an alkyl group having 1 to 3 carbon atoms, and divinylalkylsilyl groups having an alkyl group having 1 to 3 carbon atoms is particularly preferable, since it is easily introduced into an aromatic ring of the resin main chain or the end of the main chain.

A method for producing a thermosetting resin in the present invention is not particularly restricted. For example, there are listed a method in which a starting material containing a phenol derivative and/or polyphenol derivative having an unsaturated hydrocarbon group in the molecule is used, a method in which an unsaturated hydrocarbon group is introduced into the resin main chain, by using an halogenated allyl, halogenated propynyl, halogenated dialkylvinylsilane, halogenated alkyldivinylsilane, halogenated dialkylallylsilane and the like.

The heat decomposition initiation temperature Ta of A) is preferably 350° C. or more, further preferably 400° C. or more. The reason for this is that when a surface protective film or, a silica film in a lithography process is used as a ething stopper in a process for producing electric parts, particularly, a semiconductor apparatus, heat treatment at usually 350° C. or more, further 400° C. or more is preferable, and a porous organic film of the present invention is required to have corresponding durability.

B) is obtained by using monomers including a compound of the formula (1) or the formula (2) as initiation raw materials. Examples of the monomer of the formula (1) include styrene, vinyltoluene, vinylxylene, vinylmesitylene, vinylethylbenzene, vinyldiethylbenzene, vinyltriethylbenzene, vinylpropylbenzene, vinylisopropylbenzene, vinylbutylbenzene, vinyl t-butylbenzene, allylbenzene, allyltoluene, allylxylene, allylmesitylene, allylethylbenzene, allyldiethylbenzene, allyltriethylbenzene, allylpropylbenzene, allylisopropylbenzene, allylbutylbenzene, allyl t-butylbenzene, vinylnaphthalene, vinylmethylnaphthalene, vinyldimethylnaphthalene, vinyltrimethylnaphthalene, vinylethylnaphthalene, vinyldiethylnaphthalene, allylnaphthalene, allylmethylnaphthalene, allyldimethylnaphthalene, allyltrimethylnaphthalene, allylethylnaphthalene, allyldiethylnaphthalene, α-methylstyrene, α-ethylstyrene, α-propylstyrene, α-butylstyrene, α-methylvinyltoluene, α-ethylvinyltoluene, α-propylvinyltoluene, α-butylvinyltoluene, α-methylvinylnaphthalene, α-ethylvinylnaphthalene, α-propylvinylnaphthalene, and the like.

Other monomers further copolymerizable with monomers of the formula (1) and/or the formula (2) can also be mixed and used in amount in the range wherein heat decomposability is secured. As the other monomer which can form a heat decomposable resin, in general, there are listed lower alkenes having 2 to 6 carbon atoms such as ethylene, propylene, butene, isobutene and the like; acrylic acid derivatives such as acrylic acid, methyl acrylate, ethyl acrylate, propyl acrylate, t-butyl acrylate and the like; methacrylic acid derivatives such as methacrylic acid, methyl methacryalte, ethyl methacrylate, propyl methacrylate, t-butyl methacrylate and the like; alkenyl alkyl ethers such as vinyl methyl ether, vinyl ethyl ether, vinyl propyl ether, allyl methyl ether, allyl ethyl ether and the like; cyclic ethers such as ethylene oxide, propylene oxide, butene oxide, tetrahydrofuran, trioxane and the like; and other monomers. A method of polymerizing these monomers is not particularly restricted.

As the monomers of the above-described formula (1), particularly monomers selected from styrene, vinyltoluene, vinylxylene, α-methylstyrene, α-methylvinyltoluene, α-methylvinylxylene, α-ethylstyrene, α-ethylvinyltoluene and α-ethylvinylxylene are suitably used since monomers after decomposition can be transpired at temperatures of 250° C. or more, and heat decomposable resins obtained by polymerizing monomers containing one or more selected from these monomers are suitably used since weight loss after decomposition is large.

Further, heat decomposable resins obtained by using as a raw material at least one monomer selected from styrene and α-methylstyrene are preferable since heat decomposition is initiated at a temperature of 350° C. or less.

Heat decomposable resins obtained by homopolymerization of each of these two monomers or heat decomposable resins obtained by copolymerization thereof can be preferably used as the heat decomposable resin in the present invention since no waste remain in heat treatment at 350° C. or less.

Among resins of B), resins having a weight-average molecular weight in terms of polystyrene according to gel permeation chromatography (hereinafter, referred to as GPC) of 50000 or less are suitable. When the weight-average molecular weight in terms of polystyrene is over 50000, heat decomposing rate decreases, therefore, heat treatment time for forming a porous organic film becomes longer, and resultantly, throughput lowers, and a lower oligomer produced in heat decomposition causes undesirable reactions such as a crosslinking reaction and the like, and heat decomposability may decrease.

When a porous structure is formed by performing heat treatment on a film composed of A) and B) and decomposing a resin phase composed of B), the difference between heat decomposition initiation temperatures Ta and Tb of them is preferably 40° C. or more. When the difference between them is less than 40° C., a film may be broken in performing heat treatment.

Regarding the organic solvent of C), an organic solvent having in the molecule an aromatic ring, and containing a solvent having a boiling point of 250° C. or less is particularly preferable. The present inventors have found that since this organic solvent acts as a compatibilizing agent for A) and B) to resultantly increase compatibility of these resins, cavity produced after formation of a porous structure becomes finer. On the other hand, when the boiling point of this organic solvent is over 250° C., coatibility may deteriorate.

Specific examples of the above-mentioned organic solvent include aromatic hydrocarbons such as benzene, toluene, xylene, mesitylene and the like; halogenated aromatic hydrocarbons such as chlorobenzene, dichlorobenzene and the like; phenol ethers such as anisole, phenetol, veratrole, phenyl propyl ether, dimethoxybenzene and the like; phenols such as phenol, cresol and the like. Among them, at least one selected from anisole, phenetol and dimethoxybenzene, easily available industrially, is suitably used.

Regarding the organic solvent of C), other organic solvents may also be mixed with the above-mentioned organic solvents having an aromatic ring in the molecule. These other organic solvents and compounding amounts thereof can be optionally selected within ranges wherein solubility of A) and B) and applicability of a coating solution itself do not deteriorate. As the other organic solvents, alcohol-based solvents such as methanol, ethanol, 2-propanol, 1-butanol, 2-ethoxymethanol, 3-methoxypropanol and the like; ketone-based solvents such as acetylacetone, methyl ethyl ketone, methyl isobutyl ketone, 3-pentanone, 2-heptanone and the like; ester-based solvents such as propyl acetate, butyl acetate, isobutyl acetate, propylene glycol monomethyl ether acetate, ethyl lactate and the like; and ether-based solvents such as diisopropyl ether, dibutyl ether and the like, are suitable since they are industrially available safe solvents.

A coating solution of the present invention contains the above-mentioned A) to C) as essential components, and further, other additives can also be compounded in the coating solution. For example, coupling agents such as a silane coupling agent, titanium coupling agent and the like can also be compounded for increasing close adherence with a substrate, and a surfactant and a foam controlling agent can also be added for obtaining applicability or stability in forming a porous structure. Further, hardening catalysts such as an organic peroxide and the like can also be added without any problem, for the purpose of decreasing the hardening temperature Tah of A).

A method for forming a porous organic film of the present invention comprises the steps of coating a porous organic film forming coating solution of the present invention on a substrate, thermally setting the coated solution at a temperature of Tah or more and less than Tb, then, conducting heat treatment at a temperature of Tb or more and less than Ta, to generate cavity, forming a porous organic film.

The above-mentioned porous organic film forming coating solution containing A) to C) as essential components gets a porous structure by coating the coating solution on a substrate by any method such as spin coating, roller coating, dip coating and the like, then, hardening a thermosetting group in A) at a temperature of Tah or more and less than Tb, then, heat-decomposing a phase made of B) at a temperature of Tb or more and less than Ta to form cavity having a pore diameter of preferably less than 0.1 $\mu$m. The heating method is not particularly restricted, and methods using a hot plate or a furnace, and light irradiation heating using a xenon lamp, and the like can be generally used.

Use of a coating solution of the present invention can provide formation of a porous organic film which can have lowered dielectric constant, as an insulation material used in electronic devices.

EXAMPLES

The following example further illustrates the present invention, but does not limit the scope of the present invention.

Synthesis Example

Synthesis of A)

Into a 500 ml four-necked flask was charged 21.6 g (0.05 mol) of 1,1-bis(4-hydroxy-cyclohexypheyl)cyclohexylidene, 4.0 g of sodium hydroxide, 70.0 g of benzophenone and 50.0 g of toluene, and the mixture was dehydrated under reflux. After completion of the dehydration, 15.6 g (0.05 mol) of dibromobiphenyl was added. Further, a solution prepared by dissolving 0.05 g of cuprous chloride into 5 g of pyridine was added to this, and the mixture was allowed to react for 6 hours at an internal temperature of 185° C. The mixture was cooled to room temperature, then, the reaction solution was added to a solution prepared by mixing 10 g of acetic acid with 600 g of methanol, to precipitate a product. The precipitated crystal was filtrated, washed with a large amount of methanol to obtain a polymer compound, and further, it was dried under reduced pressure for 8 hours at 60° C.

To 4.0 g of thus obtained resin was added 100 ml of tetrahydrofuran, to dissolve the resin. Further, 21.5 ml of n-butyllithium (1.6 M n-hexane solution) was added, the mixture was stirred for 1 hour under nitrogen flow, then, to this was added 4.0 g of allyl bromide, and the mixture was stirred for about 1 hour. After completion of the reaction, the reaction solution was charged into a mixed solvent of 650 g of methanol and 20 g of acetic acid, to precipitate a polymer compound, and after filtration, the polymer compound was washed with methanol and subsequently with water, then, dried under reduced pressure for 8 hours at 60° C., to obtain a product in the form of a white powder. As a result of thermogravimetric analysis (DTA-50 type, manufactured by Shimadzu Corp.) under nitrogen atmosphere, the heat decomposing initiation temperature was about 425° C.

Synthesis of B)

Into a 300 ml four-necked flask was charged 10.4 g (0.1 mol) of styrene, 109 g of toluene and 0.32 g (0.001 mol) of 75% benzoyl peroxide as a catalyst, then, the mixture was allowed to react for 3 hours at 80° C. under nitrogen atmosphere. After cooling, about 700 g of methanol was poured into the reaction solution, the precipitated polystyrene was filtrated and washed with a large amount of methanol, then, dried under reduced pressure for 8 hours at 60° C. The product is referred to as Resin B. The weight-average molecular weight in terms of polystyrene measured by GPC (HLC8120 type, manufactured by Tosoh Corp., column: TSK gel SuperH3000 manufactured by Tosoh Corp.) was about 9200. The heat decomposition initiation temperature measured by thermogravimetric analysis was about 320° C.

Example 1

Resin A and Resin B obtained in the synthesis examples were dissolved in anisole, so as to give concentrations of 15% and 0.3%, respectively. Then, the solution was filtrated through a 0.2 $\mu$m filter to prepared a coating solution.

The resulted coating solution was spin-coated on a 4 inch silicon wafer at a rotation of 2000 rpm, then, pre-baked for 1 minute at 150° C. to remove most of anisole. Then, the product was subjected to heat treatment at 250° C. (thermosetting initiation temperature) for 10 minutes, then, at 350° C. for 30 minutes under nitrogen atmosphere.

The resulted porous film was cut together with the silicon wafer, and the resulted cross surface was vapor-deposited with palladium (deposited palladium film thickness: 1 nm), and the film thickness and pore diameter of cavity generated by the porous structure forming procedure were observed by watching with SEM (S-4700 type, manufactured by Hitachi, Ltd.). The film thickness was about 0.35 $\mu$m, and cavity having a pore diameter of 5 to 50 nm was observed.

What is claimed is:

1. A coating solution for forming porous organic film comprising the following A) to C), wherein A) and B) have respective heat decomposition initiation temperatures Ta and Tb satisfying a relation: Ta>Tb:

A) a thermosetting resin having an aromatic ring in the main chain and a thermosetting reaction initiation temperature Tah that is less than Tb, B) a heat decomposable resin obtained by polymerization of monomers which include at least one compound represented by the following formula (1) or (2), and C) an organic solvent,

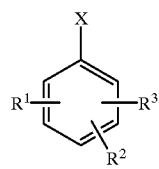

(2)

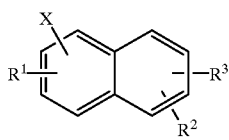

wherein, X represents an alkenyl group having 2 to 6 carbon atoms, each of $R^1$ to $R^3$ independently represents a hydrogen atom, or an alkyl group having 1 to 4 carbon atoms, and $R^1$, $R^2$ and $R^3$ in the formula (1) may be different from $R^1$, $R^2$ and $R^3$ in the formula (2) respectively;

wherein A) is a thermosetting resin having a unit structure represented by the following formula (3):

(3)

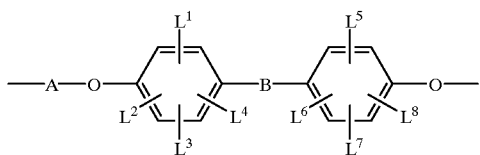

wherein, each of $L^1$ to $L^8$ is independently selected from a hydrogen atom, chlorine atom, bromine atom, iodine atom, alkyl groups having 1 to 10 carbon atoms, alkenyl groups having 2 to 10 carbon atoms, alkynyl groups having 2 to 10 carbon atoms, cycloalkyl groups having 4 to 10 carbon atoms, methoxy group, ethoxy group, phenyl group which may be substituted, and functional groups represented by the following formula (4), A is selected from one or more of the following functional groups, and B is selected from one or more of a direct bond, hydrocarbon groups having 1 to 20 carbon atoms, ether group, ketone group and sulfone group,

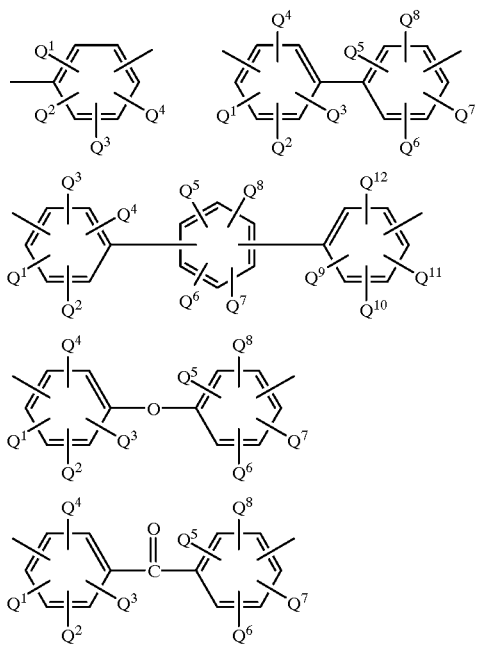

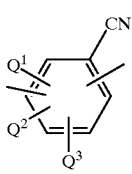 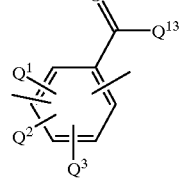 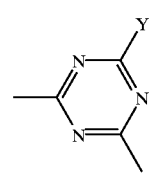

wherein, each of $Q^1$ to $Q^{12}$ is independently selected from a hydrogen atom, alkyl groups having 1 to 10 carbon atoms, alkenyl groups having 2 to 10 carbon atoms, alkynyl groups having 2 to 10 carbon atoms, and functional groups represented by the following formula (4), $Q^{13}$ is selected from alkyl groups having 1 to 10 carbon atoms, alkenyl groups having 2 to 10 carbon atoms, and alkynyl groups having 2 to 10 carbon atoms, Y is selected from a hydrogen atom, fluorine atom, chlorine atom, bromine atom, iodine atom, —$OZ^1$ group, and —N($Z^2$) ($Z^3$) group, each of $Z^1$ to $Z^3$ is independently selected from a hydrogen atom, saturated or unsaturated hydrocarbon groups, and groups containing an ether bond, $$—Si(T^1)_n(T^2)_{3-n} \qquad (4)$$

wherein, $T^1$ is selected from alkenyl groups having 2 to 10 carbon atoms, $T^2$ is selected from alkyl groups having 1 to 10 carbon atom, and arylene groups which may be substituted, n represents an integer of 1 to 3, $T^1$ may be mutually different when n is 2 or 3, and $T^2$ also may be mutually different when n is 1.

2. The coating solution according to claim 1, wherein A) is a thermosetting resin of formula (3) having a structure in the main chain in which an aromatic ring is bonded via B as an ether group.

3. The coating solution according to claim 1, wherein at least one of $L^1$ to $L^8$, $Q^1$ to $Q^{13}$ in the formula (3) is selected from the group consisting of alkenyl groups having 2 to 10 carbon atoms, alkynyl groups having 2 to 10 carbon atoms, and functional groups represented by the formula (4).

4. The coating solution according to claim 1, wherein at least one of $L^1$ to $L^8$, $Q^1$ to $Q^{13}$ in the formula (3) is selected from a vinyl group, allyl group, propargyl group, vinyldialkylsilyl groups having an alkyl group having 1 to 3 carbon atoms, and divinylalkylsilyl groups having an alkyl group having 1 to 3 carbon atoms.

5. The coating solution according to claim 1, wherein the heat decomposition initiation temperature Ta of A) is 350° C. or more.

6. The coating solution according to claim 1, wherein B) is a heat decomposable resin obtained by polymerization of monomers including at least one selected from the group consisting of styrene, vinyltoluene, vinylxylene, α-methylstyrene, α-methylvinyltoluene, α-methylvinylxylene, α-ethylstyrene, α-ethylvinyltoluene and α-ethylvinylxylene.

7. The coating solution according to claim 1, wherein B) has a weight-average molecular weight in terms of polystyrene measured by GPC of 50000 or less.

8. The coating solution according to claim 1, wherein a difference between the heat decomposition initiation temperatures Ta and Tb of A) and B) is 40° C. or more.

9. The coating solution according to claim 1, wherein the organic solvent of C) is an organic solvent which has an aromatic ring in the molecule and contains a solvent having a boiling point of 250° C. or less.

10. The coating solution according to claim 1, wherein C) is an organic solvent containing at least one selected from anisole, phenetol, and dimethoxybenzene.

11. A method for producing a porous organic film, wherein the method comprises the steps of applying a coating solution for a porous organic film forming according to claim 1 on a substrate, thermally setting the coated solution at a temperature of Tah or more and less than Tb, and conducting heat treatment at a temperature of Tb or more and less than Ta, to generate cavity.

* * * * *